(12) United States Patent
Chen

(10) Patent No.: US 12,206,310 B2
(45) Date of Patent: Jan. 21, 2025

(54) POWER GENERATION DEVICE USING CONDUCTIVE PLASMA OR IONIC SOLUTIONS

(71) Applicant: Kuo-Tso Chen, New Taipei (TW)

(72) Inventor: Kuo-Tso Chen, New Taipei (TW)

( * ) Notice: Subject to any disclaimer, the term of this patent is extended or adjusted under 35 U.S.C. 154(b) by 242 days.

(21) Appl. No.: 18/047,284

(22) Filed: Oct. 18, 2022

(65) Prior Publication Data

US 2023/0216392 A1 Jul. 6, 2023

Related U.S. Application Data

(60) Provisional application No. 63/266,457, filed on Jan. 5, 2022.

(51) Int. Cl.
*H02K 44/14* (2006.01)
*H02K 44/08* (2006.01)

(52) U.S. Cl.
CPC ........... *H02K 44/14* (2013.01); *H02K 44/085* (2013.01); *H02K 2213/03* (2013.01)

(58) Field of Classification Search
CPC ........ H02K 44/14; H02K 44/12; H02K 44/10; H02K 44/085; H02K 44/08; H02K 2213/03; F02W 2746/00032; F05B 2260/408; F05D 2260/408; G21D 7/02; B03C 1/32

USPC .......................................................... 310/11
See application file for complete search history.

(56) References Cited

U.S. PATENT DOCUMENTS

| 3,097,853 | A | * | 7/1963 | McHugh | F16C 33/1035 310/11 |
| 3,515,912 | A | * | 6/1970 | Wilkinson | H02K 44/14 310/11 |
| 2002/0043884 | A1 | * | 4/2002 | Hunter | H02K 11/0094 310/74 |
| 2019/0028012 | A1 | * | 1/2019 | Abledu | H02K 1/185 |
| 2019/0372449 | A1 | * | 12/2019 | Mills | H02S 10/30 |
| 2020/0366180 | A1 | * | 11/2020 | Mills | C01B 3/00 |
| 2023/0107844 | A1 | * | 4/2023 | Prater | H02K 44/085 310/11 |

FOREIGN PATENT DOCUMENTS

CN 110492147 A 11/2019
CN 211005641 U 7/2020

* cited by examiner

*Primary Examiner* — Michael Andrews
(74) *Attorney, Agent, or Firm* — CKC & Partners Co., LLC

(57) ABSTRACT

A power generation device includes a housing, chambers, and conductive fillers. The housing has a rotation axis. The chambers surround the rotation axis and located inside the housing. The conductive fillers respectively filled in the chambers. The chambers include electrodes. The electrodes are located on the chambers and in contact with the conductive fillers.

14 Claims, 12 Drawing Sheets

POWER GENERATION DEVICE USING CONDUCTIVE PLASMA OR IONIC SOLUTIONS

CROSS-REFERENCE TO RELATED APPLICATION

This application claims priority to U.S. Provisional Application Ser. No. 63/266,457, filed Jan. 5, 2022, which is herein incorporated by reference in its entirety.

BACKGROUND

Field of Invention

The present disclosure relates to a power generation device.

Description of Related Art

With the increase in global warming, many countries invest the research on green energy. Well-known green energy such as solar energy, wind energy, and hydroelectric power has been utilized in many different regions. However, compared with traditional power generation methods, the power generation cost of most green energy sources is relatively high, and the heat-to-power conversion is relatively inefficient. How to improve the power generation efficiency of green energy and reduce the cost of green energy are the problems waiting to be solved.

SUMMARY

The disclosure provides a power generation device includes a housing, chambers, and conductive fillers. The housing has a rotation axis. The chambers surround the rotation axis and located inside the housing. The conductive fillers respectively filled in the chambers. The chambers include electrodes. The electrodes are located on the chambers and in contact with the conductive fillers.

In an embodiment of the present disclosure, sidewalls of the chambers extend along a direction that is perpendicular to the rotation axis and divide an interior of the housing into layers.

In an embodiment of the present disclosure, the electrodes at least comprise a first electrode and a second electrode. The first electrode is adjacent to the rotation axis and the second electrode is away from the rotation axis. One of the chambers electrically connects to an adjacent one of the chambers through the first electrode. The one of the chambers electrically connects to another adjacent one of the chambers through the second electrode.

In an embodiment of the present disclosure, sidewalls of the chambers extend along a direction that is parallel to the rotation axis and separate the housing into rooms.

In an embodiment of the present disclosure, the rooms at least include first rooms and second rooms. In a cross section perpendicular to the rotation axis, the first rooms are adjacent to the rotation axis and are isolated from each other. The second rooms are away from the rotation axis and are isolated from each other.

In an embodiment of the present disclosure, one of the electrodes radially and electrically connects the conductive fillers in at least one of the first rooms and at least one of the second rooms relative to the rotation axis.

In an embodiment of the present disclosure, the chambers are spheres and movable relatively to the housing.

In an embodiment of the present disclosure, the electrodes are located on surfaces of the spheres, such that the conductive fillers respectively in two of the spheres are electrically connected through two of the electrodes respectively on the two of the spheres.

In an embodiment of the present disclosure, the conductive fillers respectively in adjacent two of the chambers have different compositions.

In an embodiment of the present disclosure, the conductive filler includes plasma or ionic solutions.

In an embodiment of the present disclosure, ions of the ionic solutions include at least one of $K^+$, $Na^+$, $Li^+$, $Cl^-$, $Br^-$, $F^-$, $I^-$, carbonate ion, acetate ion, formate ion, and acetate ion.

In an embodiment of the present disclosure, pH values of ionic solutions are between 5 and 9.

In an embodiment of the present disclosure, the conductive filler includes at least one of water, methanol, ethanol, ethylene glycol and water-soluble amide. In an embodiment of the present disclosure, the power generation device further includes magnetic components. The magnetic components are located on two opposite sides of the housing respectively. The housing may rotate through a magnetic field produced by the magnetic components.

In an embodiment of the present disclosure, the power generation device further includes magnetic components. The magnetic components are located on a same side of the housing. The housing may rotate through a magnetic field produced by the magnetic components.

In an embodiment of the present disclosure, the housing further includes shells wrapped in sequence from the inside out. The shells are rotatable relatively to each other.

In an embodiment of the present disclosure, the shells include openings.

Each shell includes at least two of the openings.

In an embodiment of the present disclosure, the housing and the chambers are heat conductors.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
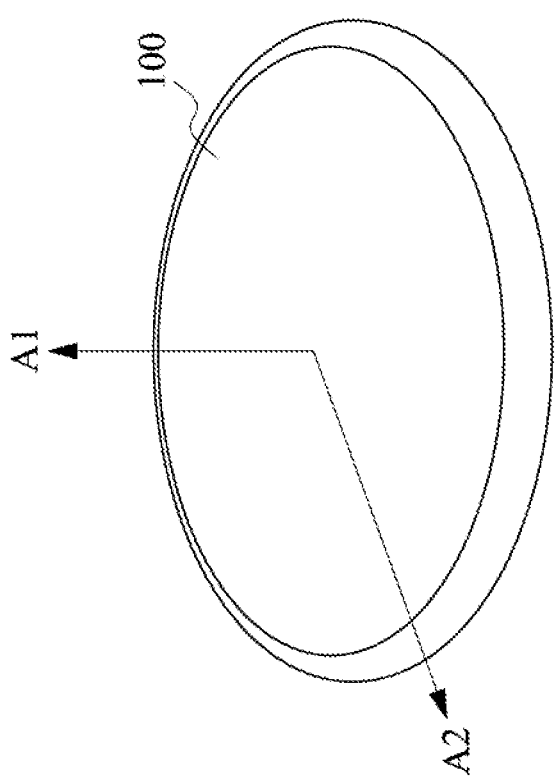
FIG. 1 schematically illustrates a power generation device, according to one embodiment of the present disclosure.

Reference will now be made in detail to the present embodiments of the disclosure, examples of which are illustrated in the accompanying drawings.

Wherever possible, the same reference numbers are used in the drawings and the description to refer to the same or like parts.

Figure 2B:
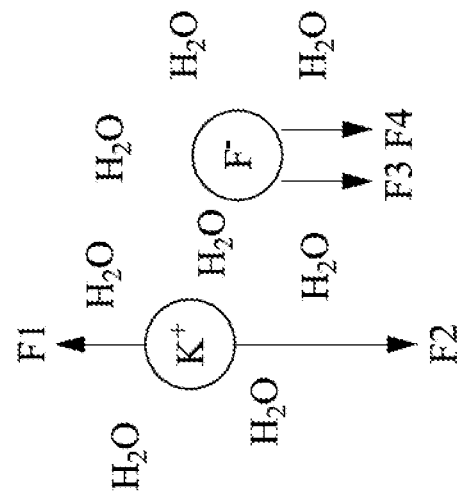
FIG. 2B schematically illustrates a conductive filler filled in the chamber of the power generation device in FIG. 2A.
Figure 2A:
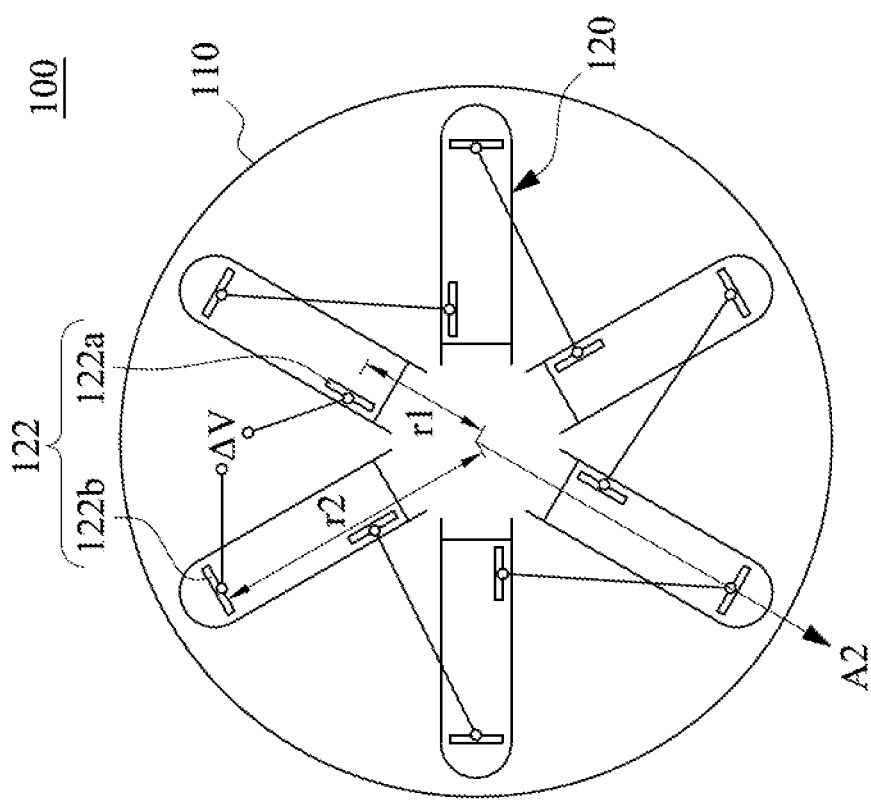
FIG. 2A schematically illustrates a cross sectional view perpendicular to the rotation axis of a power generation device, according to one embodiment of the present disclosure.

FIG. 1 schematically illustrates a power generation device 100, according to one embodiment of the present disclosure. FIG. 2A schematically illustrates a cross sectional view perpendicular to the rotation axis of a power generation device 100, according to one embodiment of the present disclosure. FIG. 2B schematically illustrates the conductive fillers filled in the chamber 120 of the power generation device 100 in FIG. 2A. References are made to FIGS. 1, 2A and 2B, a power generation device 100 includes a housing 110, chambers 120, and conductive fillers. The housing 110 has a rotation axis A1. The chambers 120 surround the rotation axis A1 and located inside the housing 110.

The conductive fillers fill the chambers 120. The chambers 120 include electrodes 122. The electrodes 122 are located on the chambers 120 and in contact with the conductive fillers. In the embodiment shown in FIG. 1, the shape of the housing 110 is approximately a disk shape. However, any other suitable shape may be used. The housing 110 offers an accommodation space for containing the chambers 120 (as shown in FIG. 2A). In FIG. 1, the power generation device 100 has a rotation axis A1. The rotation axis A1 is in the center of the dish-shaped housing 110, however, other possible set up may be applied. The position of the rotation axis A1 maybe adjusted according to the setting of the chambers 120 that are located inside the housing 110 (as shown in FIG. 2A). As shown in FIG. 1 and FIG. 2A, the chambers 120 surround the rotation axis A1, and each one of the chambers 120 has two electrodes 122, the first electrode 122a and the second electrode 122b. The first electrode 122a is adjacent to the rotation axis A1, and the second electrode 122b is away from the rotation axis A1.

References are made to FIGS. 1, 2A and 2B, when the housing 110 rotates along the rotation axis A1, each one of the chambers 120 may experience a centrifugal force which may generate a voltage drop $\Delta V$ on two opposite sides of each one of the chambers 120. In the embodiment shown in FIG. 2A, the voltage drop $\Delta V$ may be measured by the first electrode 122a and the second electrode 122b that are set on two opposite sides of the chambers. The principle for generating voltage drops $\Delta V$ during the rotation of the housing 110 is due to the positive and negative ions of the conductive filler being separated inside the chamber 120 through the experience of the centrifugal force. In some of the embodiments, the conductive filler includes plasma, such as LiCl plasma, or ionic solutions such as KOH, HCl, and KCl aqueous solutions, or the likes. In some embodiments, the ions of the ionic solutions include at least one of $K^+$, $Na^+$, $Li^+$, $Cl^-$, $Br^-$, $F^-$, $I^-$, carbonate ion, acetate ion, formate ion, and acetate ion. The conductive filler may be acidic aqueous solutions, alkaline aqueous solutions or salt aqueous solutions. Specifically, under the same ion concentration, when the pH values of the ionic solutions are closer to 7, the greater the voltage drop $\Delta V$ may be produced. In one example, the pH values of ionic solutions are between 5 and 9. In another example, the pH values of ionic solutions may be between 6 and 8, which may provide greater voltage drops $\Delta V$ than the ionic solutions with pH values between 5 and 9. In the following paragraphs, examples shown in FIG. 2A and FIG. 2B may be described in more detail for one to better understand the principle of the power generation device 100.

References are made to FIG. 1, and FIG. 2A, specifically, when plasma exists in an airtight and fast rotation room, due to the centrifugal force, the plasma will have an ion density difference between a side that is adjacent to the rotation center (may know as near side) and a side that is away from the center (may know as far side), if the ionization rates on both sides are nearly the same. The centrifugal force equation is written as: $F=m\omega^2 r$, where F represents the centrifugal force experienced by the ion, m represents the mass of the ion, w represents the angular velocity, and r represents the distance between the ion and the rotation axis A1. According to the centrifugal force equation, when no external electric field exists, the centrifugal force experienced by the ion is proportional to the mass of the ion. In other words, when the mass of the ion is larger, the centrifugal force may be larger, and the ion density difference between the near side and the far side may be larger, vice versa. Take LiCl plasma as an example, the mass of $Cl^-$ ion is about 5 times larger than the mass of $Li^+$ ion. Therefore, the $Cl^-$ ion will experience a centrifugal force 5 times larger than the $Li^+$ ion, which make the $Cl^-$ ions distribute on the far side, and the $Li^+$ ion distribute on the near side. However, following the charge conservation law, the $Cl^-$ ion may attract the $Li^+$ ion to the far side, and the $Li^+$ ion may attract the $Cl^-$ ion to the near side, an electric field is being formed between the far side and the near side, this attraction is from the charge. The voltage drop $\Delta V$ generated by the difference in charge between the inside and the outside. A voltage drop $\Delta V$ cause by the electric field may be used to generate power.

References are made to FIGS. 1, 2A and 2B, the effect of centrifugal force identical with preceding item to ion is also established to ion in aqueous solutions. In the embodiment shown in FIG. 2B the conductive filler is KF aqueous solution. When forces experienced by the ions are balanced, the ions may stay in their balanced position. In the ion solution, there are two kinds of processes against the centrifugal force during the rotation. One is the driving force of the ion diffusion process due to the concentration difference of the solution, while another is the Coulomb force applied from the self-generated electric field to the ions by the centrifugal force corresponding to the self-generated electric field during the rotation of the housing 110. When the concentration of the positive ions (such as $K^+$) and the negative ions (such as $F^-$) are balanced, the driving force of the ion diffusion process is nearly the same on the $K^+$ ions and the F⁻ ions and may be ignored. When the density of the ion (which may obtain by dividing the mass of the ion by the volume of the ion) is huge, the summation of Coulomb force (F1 for K⁺ ion, and F4 for F⁻ ion) and the centrifugal force (F2 for K⁺ ion, and F3 for F⁻ ion) applied on the positive ions and the negative ions may be about the same. Thus the positive ions and the negative ions may stay in a balanced position.

References are made to FIG. 1, 2A, and FIG. 2B, specifically, chamber 120 of a power generation device 100 includes a first electrode 122a set at the near side (according to the rotation axis A1), and a second electrode 122b set at the far side. The first electrode 122a has a first distance r1 according to the rotation axis A1, and the second electrode 122b second distance r2 according to the rotation axis A1. The conductive filler filled inside chambers 120 is KF aqueous solution. Assuming the first distance r1 is 0.03 m, the second distance r2 is 0.13 m, and the rotational speed is 50 k revolutions per minute (RPM). The mass of the K⁺ ion is about $6.49423 \times 10^{-26}$ kg, and the effective volume of the K⁺ ion is about $1.58 \times 10^{-29}$ m³, while the mass of the F⁻ ion is about $3.15563 \times 10^{-26}$ kg, and the effective volume of the F⁻ ion is about $1.41 \times 10^{-29}$ m³. Based on the centrifugal force equation written in the above paragraph, one may obtain a voltage drop ΔV between the first electrode 122a and the second electrode 112b is about 43.33 mV. It should be noted that no matter the composition of the conductive filler, the voltage drop ΔV of each chamber 120 may be added up by connecting the electrodes 122 in series.

For example, as shown in FIG. 2A, the first electrode 122a in chamber 120 may be connected to the second electrode 122b in another chamber 120 which is adjacent to it. In some other embodiments, the conductive fillers respectively in adjacent two of the chambers 120 have different compositions. The amount of power generated by the power generation device 100 may be decided by the number of chambers 120 and the composition of the conductive filler.

References are made to FIGS. 1, 2A and 2B, in some embodiments, the housing 110 and the chambers 120 are heat conductors. After generating the power, a part of the ions will form as atoms or molecules. However, by applying sufficient heat to the atoms or molecules, the ions maybe reproduce and the voltage drop ΔV maybe rebuild again through the process discussed above. Moreover, if the friction force during the rotation is approximately zero, due to the conservation of moment of inertia, the rotation speed is also conserved and the rotation may be non-stop. This may provide a non-stop power generation device 100 that may transfer heat energy to electricity with about 100% conversion efficiency, which may be a high efficiency green energy. To expand the scope of the use of the power generator, in some embodiments, the conductive filler includes at least one of water, methanol, ethanol, ethylene glycol, and water-soluble amides, which may prevent the conductive filler from freezing. As a result, the power generation device 100 may be used under low temperatures, such as being used to generate power near the polar region. In another case, the power generation device 100 may be installed on the roof of the building. The power generation device 100 may be heated up by the sun and the air, thus ensuring a non-stop power generation process. The power generated by the power generation device 100 may supply the electricity of the building, and achieve zero carbon emissions.

Figure 3:
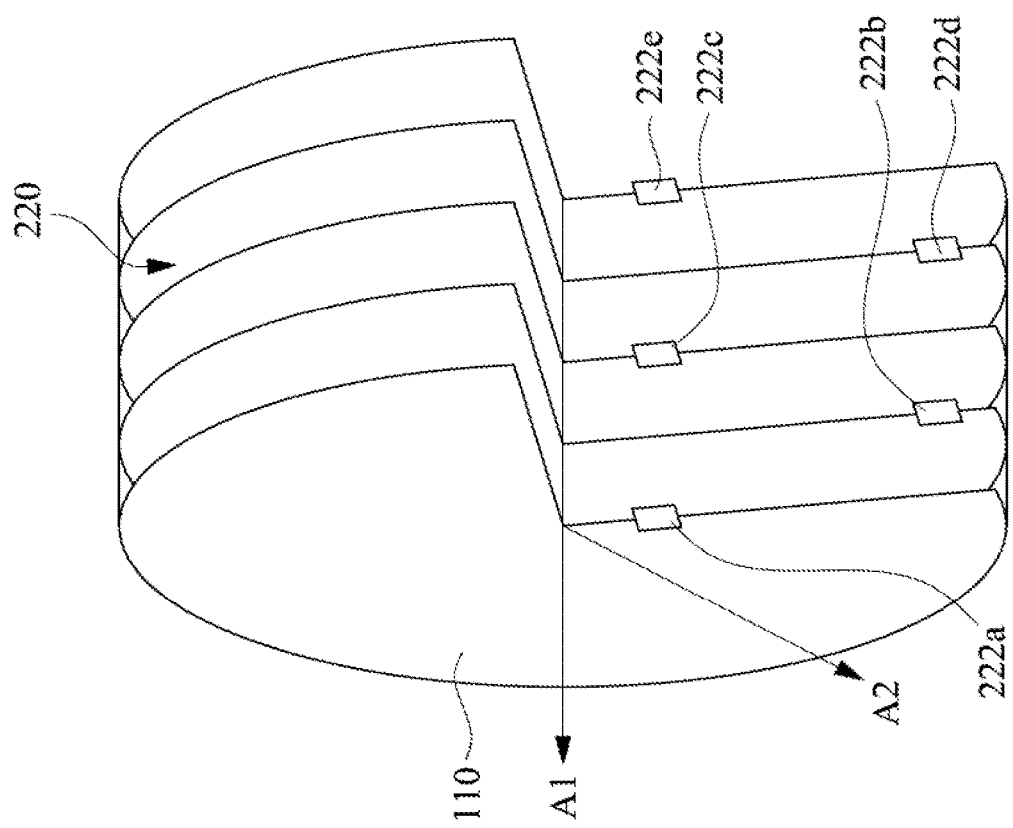
FIG. 3 schematically illustrates a three-dimensional cross-sectional view of a power generation device, according to another embodiment of the present disclosure.

FIG. 3 schematically illustrates a three-dimensional cross-sectional view of a power generation device 200, according to another embodiment of the present disclosure. References are made to FIGS. 1 and 3. In the embodiment shown in FIG. 3, the housing 110 may has the same shape as described in FIG. 1. In the embodiment, sidewalls of the chambers 220 extend along a direction A2 that is perpendicular to the rotation axis A1 and divide an interior of the housing 110 into layers. In other words, each chamber 220 represents one layer and extends along the radical direction A2 of the housing 110. For example, each of the chambers 220 is in a disk shape, and multiple disk-shaped chambers 220 stacked along the rotation axis A1, and all of the chambers 220 are rotating according to the rotation axis A1. In some embodiments, the electrodes 222 at least comprise a first electrode 222c and a second electrode 222b. The first electrode 222c is adjacent to the rotation axis A1 and the second electrode 222b is away from the rotation axis A1. One of the chambers 220 electrically connects to an adjacent one of the chambers 220 through the first electrode 222c. The one of the chambers 220 electrically connects to another adjacent one of the chambers 220 through the second electrode 222b.

References are made to FIGS. 1 and 3, specifically, in the embodiments shown in FIG. 3, there exist multiple first electrodes 222a, 222c, 222e, and multiple second electrodes 222b, 222d. The first electrodes 222a, 222c, 222e are set adjacent to the rotation axis A1, and the second electrodes 222b, 222d are set away from the rotation axis A1. During the rotation of the housing 110 according to the rotation axis A1, the conductive filler, such as plasma or ionic solutions, containing positive and negative ions may distributed according to the mass of the ions, and forms an electric field, which is similar to the descriptions related to FIG. 1, FIG. 2A, and FIG. 2B. The voltage drops that exist between the electrodes 222 may be added up by connecting each chamber 120 in series.

For example, each chamber 220 may be connected in series through the following sequence: the first electrode 222a, the second electrode 222b, the first electrode 222c, the second electrode 222d, and the first electrode 222e. Each chamber 220 is connected between the electrodes 222. The added-up voltage drop of the power generation device 200 may be output by the first electrode 222a and the first electrode 222e. In some example, the adjacent two chambers 220 are filled by the conductive filler including different compositions respective, such as KOH aqueous solution, and HCl aqueous solution. However, other suitable conductive filler may be use.

Figure 4:
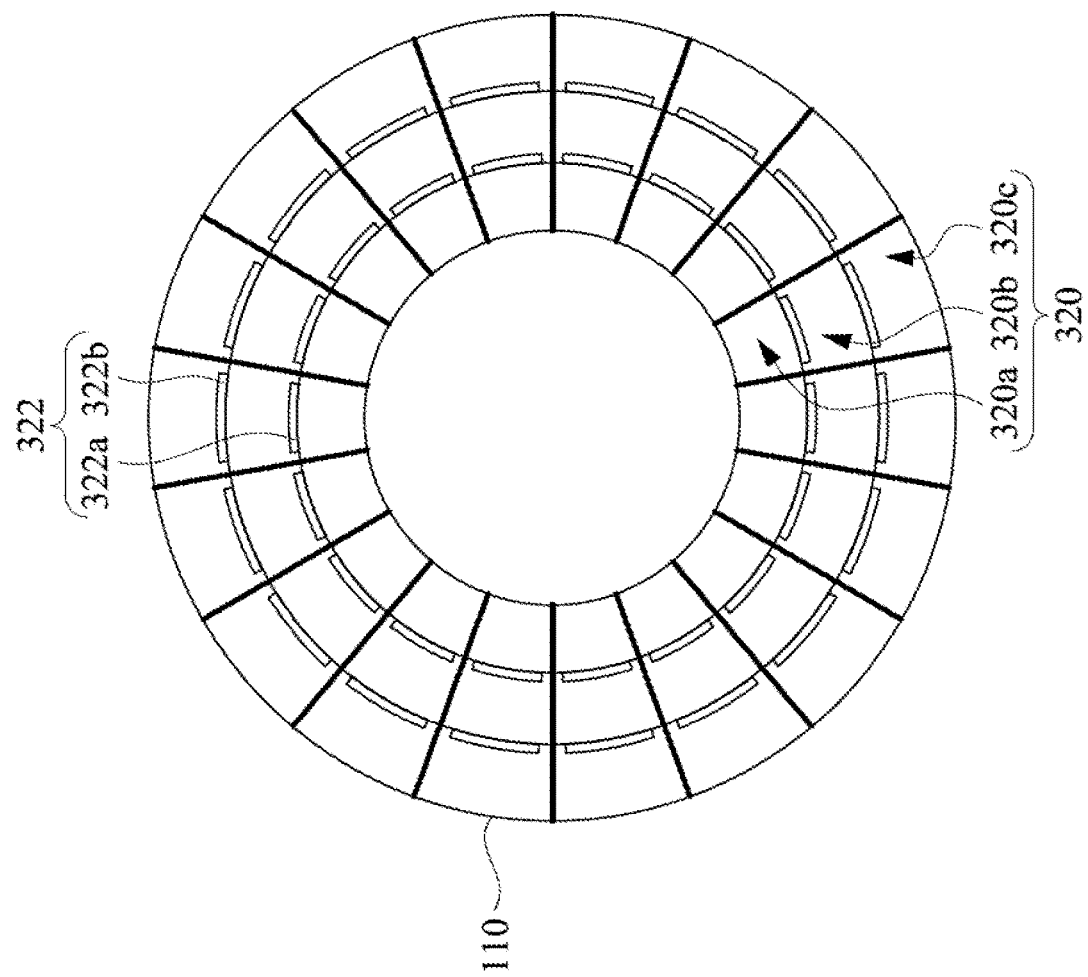
FIG. 4 schematically illustrates a cross sectional view perpendicular to the rotation axis of a power generation device, according to another embodiment of the present disclosure.

FIG. 4 schematically illustrates a cross sectional view perpendicular to the rotation axis of a power generation device 300, according to another embodiment of the present disclosure. References are made to FIGS. 1 and 4. In the embodiment shown in FIG. 4, the housing 110 may has the same shape as described in FIG. 1. In an embodiment, the sidewalls of the chambers 320 extend along a direction that is parallel to the rotation axis A1 and separate the housing 110 into rooms 320. In other words, multiple chambers 320 may be multiple rooms 320 surround the rotational axis A1 and extend along the direction of the rotation axis A1 of the housing 110. In the embodiment shown in FIG. 4, the chamber 320 further divided into smaller rooms 320a, 320b, 320c by the sidewalls extends around the rotation axis A1. However, other suitable size and number of the rooms may be used. In some embodiments, the rooms 320 at least include first rooms 320a and second rooms 320b. In a cross section perpendicular to the rotation axis A1, the first rooms 320a are adjacent to the rotation axis A1 and are isolated from each other. The second rooms 320b are away from the rotation axis A2 and are isolated from each other.

References are made to FIGS. 1 and 4, specifically, in the embodiments shown in FIG. 4, there exist multiple first rooms 320a, second rooms 320b, and third rooms 320c. The first rooms 320a is adjacent to the rotation axis A1, the second rooms 320b is away from the rotation axis A1, and the third rooms 320c is even farer away from the rotation axis A1 than the second rooms 320b. In FIG. 4, each of the second rooms 320b is between the first rooms 320a and the third rooms 320c, and corresponds to one of the first rooms 320a and one of the third rooms 320c. In some embodiments, one of the electrodes 322 radially and electrically connects the conductive fillers in at least one of the first rooms 320a and at least one of the second rooms 320b relative to the rotation axis A1. In other words, the electrodes connect the first rooms 320a and the second rooms 320b along the radical direction A2. Specifically, multiple first electrodes 322a are located between the first rooms 320a and the second rooms 320b. Multiple second electrodes 322b are located between the second rooms 320b and the third rooms 320c. During the rotation of the housing 110 according to the rotation axis A1, the conductive filler, such as plasma or ionic solutions, containing positive and negative ions may distributed according to the mass of the ions, and forms an electric field, which is similar to the descriptions related to FIG. 1, FIG. 2A, and FIG. 2B. The voltage drops that exist between the electrodes 322 may be added up by connecting each chamber 320 in series. For example, the first rooms 320a, the second rooms 320b, and the third rooms 320c may connect in series through the first electrodes 322a and the second electrodes 322b respectively.

Figure 5A:
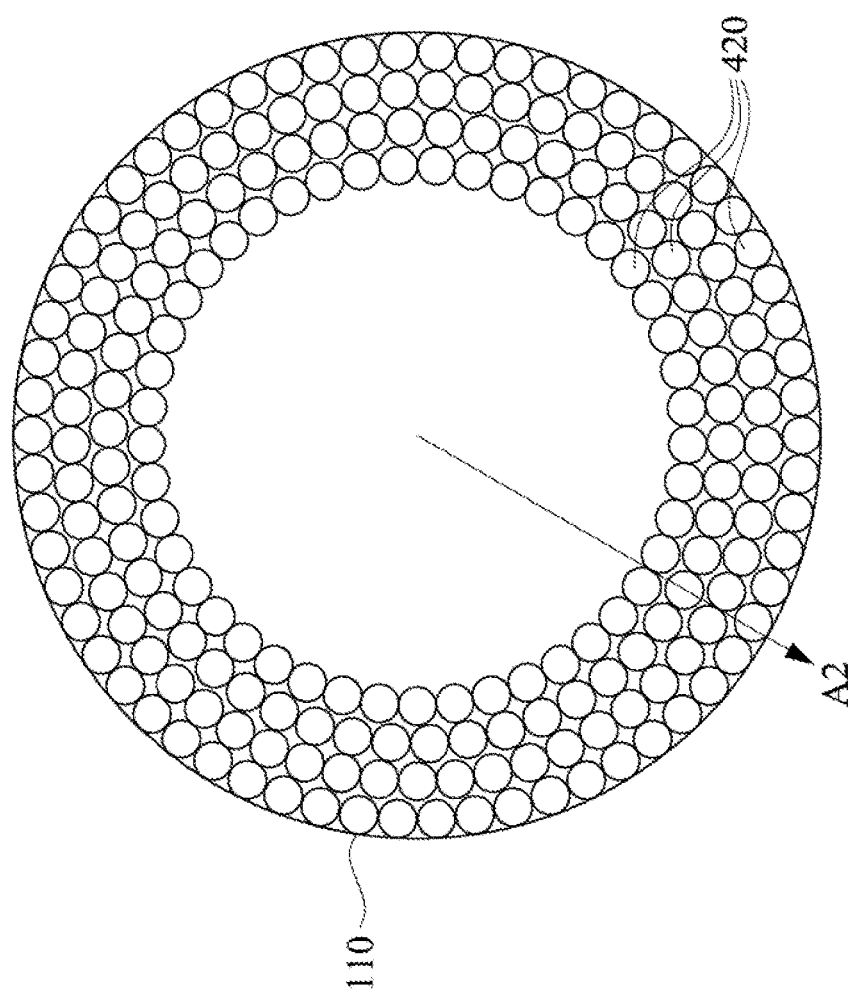
FIG. 5A schematically illustrates a cross sectional view perpendicular to the rotation axis of a power generation device, according to another embodiment of the present disclosure.
Figure 5B:
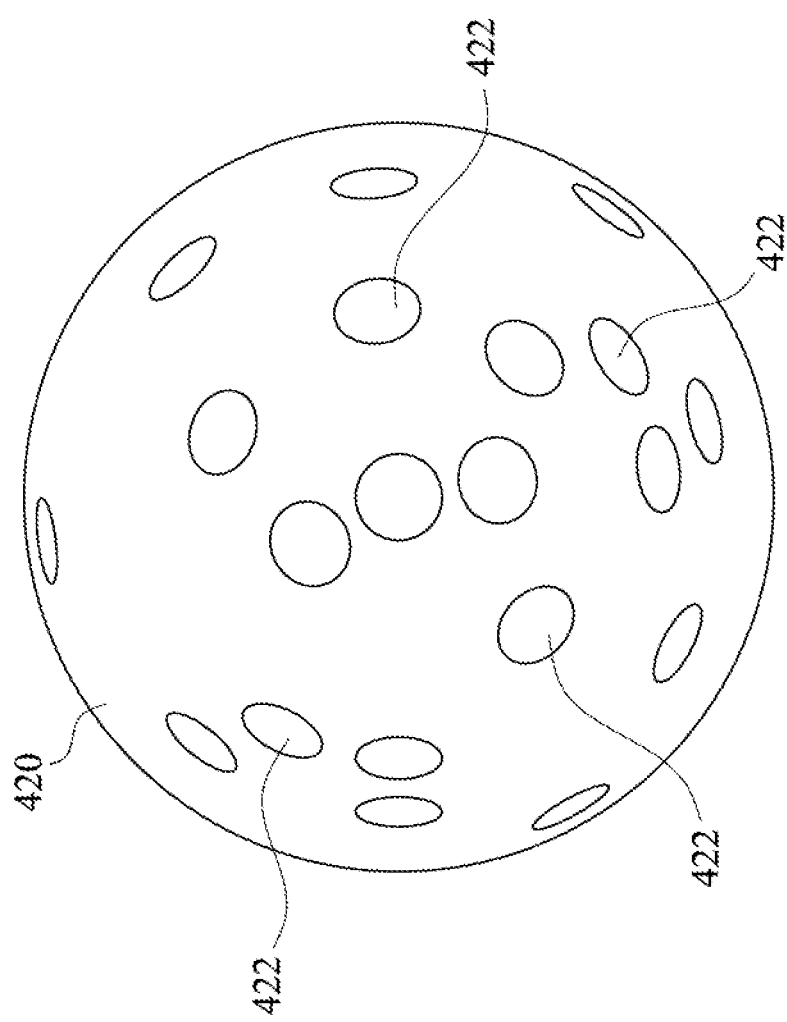
FIG. 5B schematically illustrates a chamber of the power generation device in FIG. 5A.

FIG. 5A schematically illustrates a cross sectional view perpendicular to the rotation axis of a power generation device 400, according to another embodiment of the present disclosure. FIG. 5B schematically illustrates a chamber 420 of the power generation device 400 in FIG. 5A. References are made to FIGS. 1, 5A and 5B, in the embodiment shown in FIGS. 5A, and 5B, the housing 110 may has the same shape as described in FIG. 1. In an embodiment, the chambers 420 are spheres and movable relatively to the housing 110. In the embodiment shown in FIG. 5A, multiple sphere-like chambers 420 are located inside the housing 150. While housing 110 is rotating according to the rotation axis A1, each of the sphere-like chambers 420 may experience a centrifugal force, then the chambers 420 may toss to the wall of the housing 110 and evenly distribute around the rotation axis A1. In FIG. 5B, a sphere-like chamber 420 is shown as an example. In some embodiments, the electrodes 422 are located on surfaces of the spheres 420, such that the conductive fillers respectively in two of the spheres 420 are electrically connected through two of the electrodes 422 respectively on the two of the spheres 420. Specifically, multiple electrodes 422 are located on the surface of the sphere-like chamber 420 and facing different directions, which make the sphere-like chamber 420 may electrically connect to the adjacent chamber 420 in different angle. The sphere-like chamber 420 may be connected in series through the electrodes 422, and the voltage drop of each chamber 420 may be added up. During the rotation of the housing 110 according to the rotation axis A1, the conductive filler, such as plasma or ionic solutions, containing positive and negative ions may distributed according to the mass of the ions, and forms an electric field, which is similar to the descriptions related to FIG. 1, FIG. 2A, and FIG. 2B.

Figure 7A:
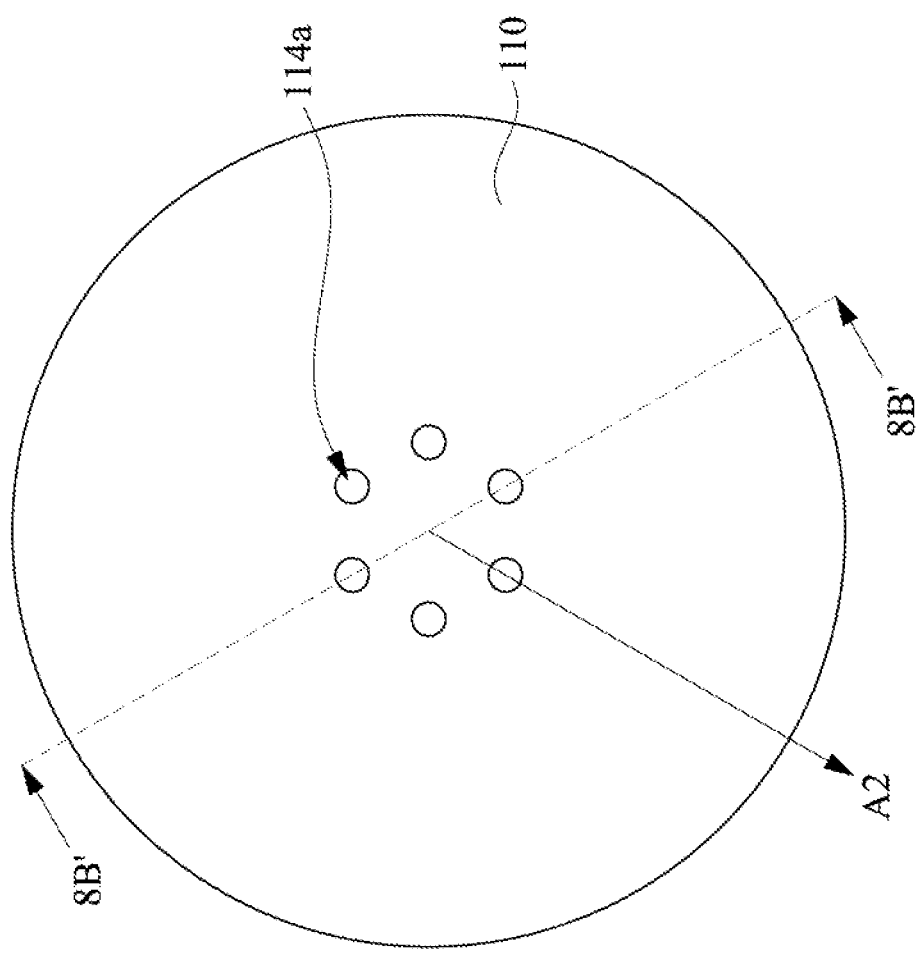
FIG. 7A schematically illustrates a cross sectional view perpendicular to the rotation axis of a power generation device, according to another embodiment of the present disclosure.
Figure 7B:
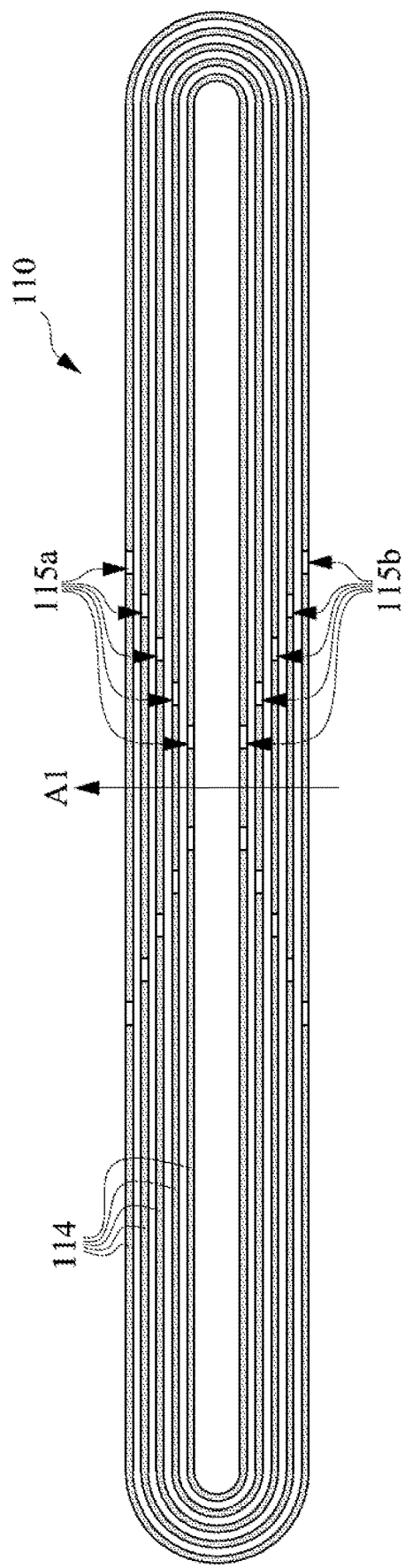
FIG. 7B schematically illustrates a cross-sectional view of the power generation device in FIG. 7A.
Figure 7C:
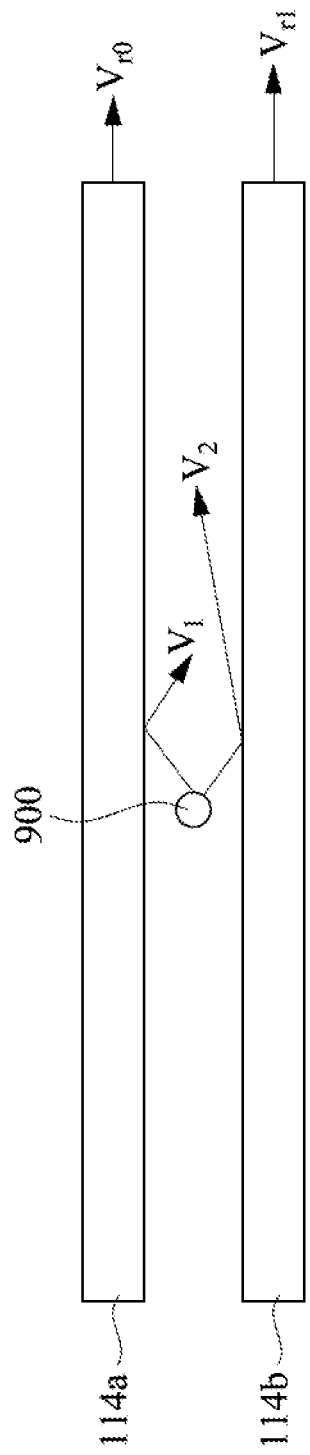
FIG. 7C schematically illustrates a diagram of an air particle moving between two shells of the power generation device in FIG. 7A.
Figure 7D:
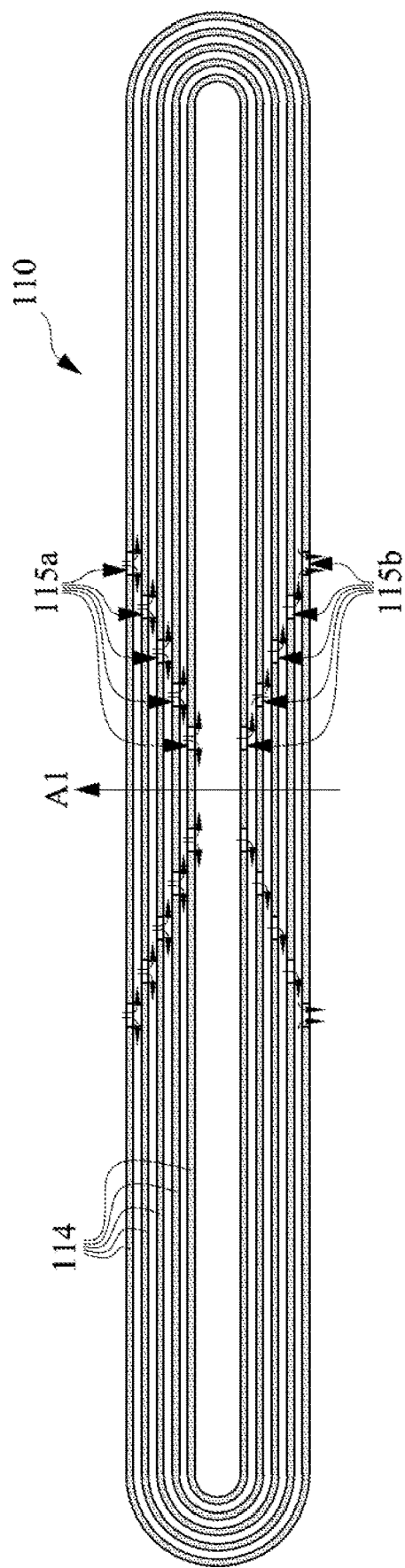
FIG. 7D schematically illustrates a cross-sectional view with air flows of the power generation device in FIG. 7A.

FIG. 7A schematically illustrates a cross sectional view perpendicular to the rotation axis of a power generation device 100, according to another embodiment of the present disclosure. FIG. 7B schematically illustrates a cross-sectional view of the power generation device 100 in FIG. 7A. FIG. 7C schematically illustrates a diagram of an air particle 900 moving between two shells 114a, 114b of the power generation device 100 in FIG. 7A. FIG. 7D schematically illustrates a cross-sectional view with air flows of the power generation device 100 in FIG. 7A. References are made to FIG. 7A-FD, in some embodiments, the housing 110 further includes shells 114 wrapped in sequence from the inside out. The shells 114 are rotatable relatively to each other. The number of the shells 114 shown in FIG. 7B is 5. However, other numbers of shell 114 may be use. The shells 114 are connected to the rotation axis A1 respectively, and may rotate relatively to each other. In some embodiments, the shells 114 include openings 115a, 115b. Each shell 114 includes at least two of the openings 115a, 115b. Specifically, the openings 115a, 115b may accelerate the airflow between each of the shells 114, which may help to increase the rotation speed of the shells 114. Some of the openings 115a are located on the same side of the housing 110 (for example, the top of the housing 110) which suck airflow into the housing 110, while some of the openings 115b are located on the opposite side of the housing 110 (for example, the bottom of the housing 110) which release airflow out of the housing 110.

References are made to FIG. 7A-7D, the housing 110 with multiple shells 114 and openings 115a, 115b may reduce the friction force of the housing 110 during the rotation to approximately zero. Furthermore, the innermost shell 114 of this kind of housing 110 may have the fastest rotation speed. Specifically, two of the shells 114a, 114b are shown in FIG. 7C, an air particle 900 is moving between the shells 114a, 114b. During moving, the air particle 900 may collide with the shells 114a, 114b, and change its movement speed (such as speed $V_1$ and $V_2$ after the collision with shells 114a, 114b respectively). Assuming the speed of the outer shell 114a is $V_{r0}$, the speed of the inner shell 114b is $V_{r1}$, and the speed component of the air particle 900 which is vertical to the shells 114a, 114b is $V_{air}$. The energy loss $E_{loss}$ of the air particle 900 due to each collision with the shell 114a, 114b may be obtained as $E_{loss}=(m_{air}/2)*((V_{r1}-V_{r0})/2)^2$, where $m_{air}$ represents the mass of the air particle 900. When the number of the shell 114 is n+1, and assuming the speed of the outermost shell 114 is 0, the energy loss of the air particle 900 may be written as $E_{loss}=(m_{air}*V_n^2)/8n$, where $V_n$ represents the speed of the innermost shell 114. According to the equation above, when n is very large, the energy loss $E_{loss}$ is approximately 0, which means the work done by the friction force of the housing 110 during rotation is approximately 0. Therefore, one may obtain that the friction force of the housing 110 during rotation is approximately 0.

Figure 6A:
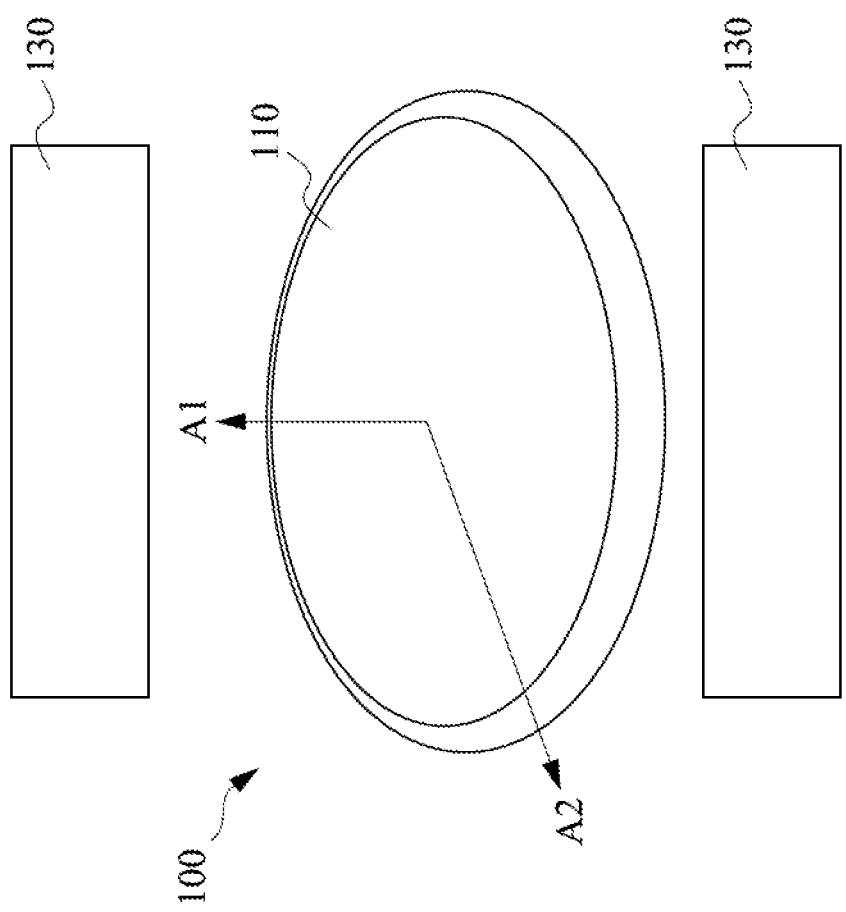
FIG. 6A schematically illustrates a power generation device with magnetic components, according to one embodiment of the present disclosure.

FIG. 6A schematically illustrates a power generation device 100 with magnetic components 130, according to one embodiment of the present disclosure. Reference is made to FIG. 6A. In some embodiments, the power generation device 100 further includes magnetic components 130. The magnetic components 130 are located on two opposite sides of the housing 110 respectively. The housing 110 may rotate through a magnetic field produced by the magnetic components 130. The magnetic components 130 may be magnets or electric magnets. However, other suitable components may be use. The two magnetic components 130 in the illustration are on opposite sides of the housing 110, but in other designs, they can also be on the same side of the housing 110. Additional embodiments may also have more than two magnetic components 130.

Reference is made to FIG. 6A, the power generation device 100 with magnetic components 130 may speed up, and slow down the rotation of the housing 110 without touching it, the reason will be discussed in the following. If heated molecules are charged, one can apply magnetic fields to the heated molecules and change their moving directions, this will transfer their thermal energy to directional kinetic energy. For example, a housing 110 is filled with heated gas, where the gas can be partially ionized to molecules with positive charges or negative charges (e.g., the conductive filler) and applied to an external magnetic field. When the temperature of the gas rises, a certain proportion of the gas molecules will be ionized, and an induced charge will be generated on the housing 110 simultaneously, where the induced charge of the housing 110 and the ionized charge of the molecules are opposite. If the ionized charge is positive, the induced charge of the housing will be negative. On the contrary, if the ionized charge is negative, the induced charge of the housing will be positive. The ionized charge is moving inside the chamber and the induced charge is fixed on the housing 110.

Reference is made to FIG. 6A, since the existence of the external magnetic field, the ionized charge may move in a circular path along the walls of the housing 110. Multiple ions may collide with the wall of the housing 110 and rotate the housing 110. The amount of force applied to the housing 110 from the ions depends on the mass of the ions. The rotation direction of the housing 110 is determined by whether the charge of the ions is positively or negatively charged and the direction of the magnetic field. The net force given by the ions may apply an action force to the housing 110, which rotates the housing 110 according to the rotation axis A1. On the other hand, the ions may also experience an opposite reaction force. Due to the rotation of the housing 110, one may transform the voltage drops of the chambers 120 inside the housing 110 (as shown in FIG. 2A) which provides by the rotation to electricity or other energy forms. During the energy transformation, due to the reaction force applied to the ions, its velocity will decrease, and the temperature of the ions will also decrease. Therefore, one can transform the thermal energy of the ions to electrical energy or other energy forms. In some embodiments, one may apply a fixed or variated electric field to increase the ionization rate of the gas molecules.

Figure 6B:
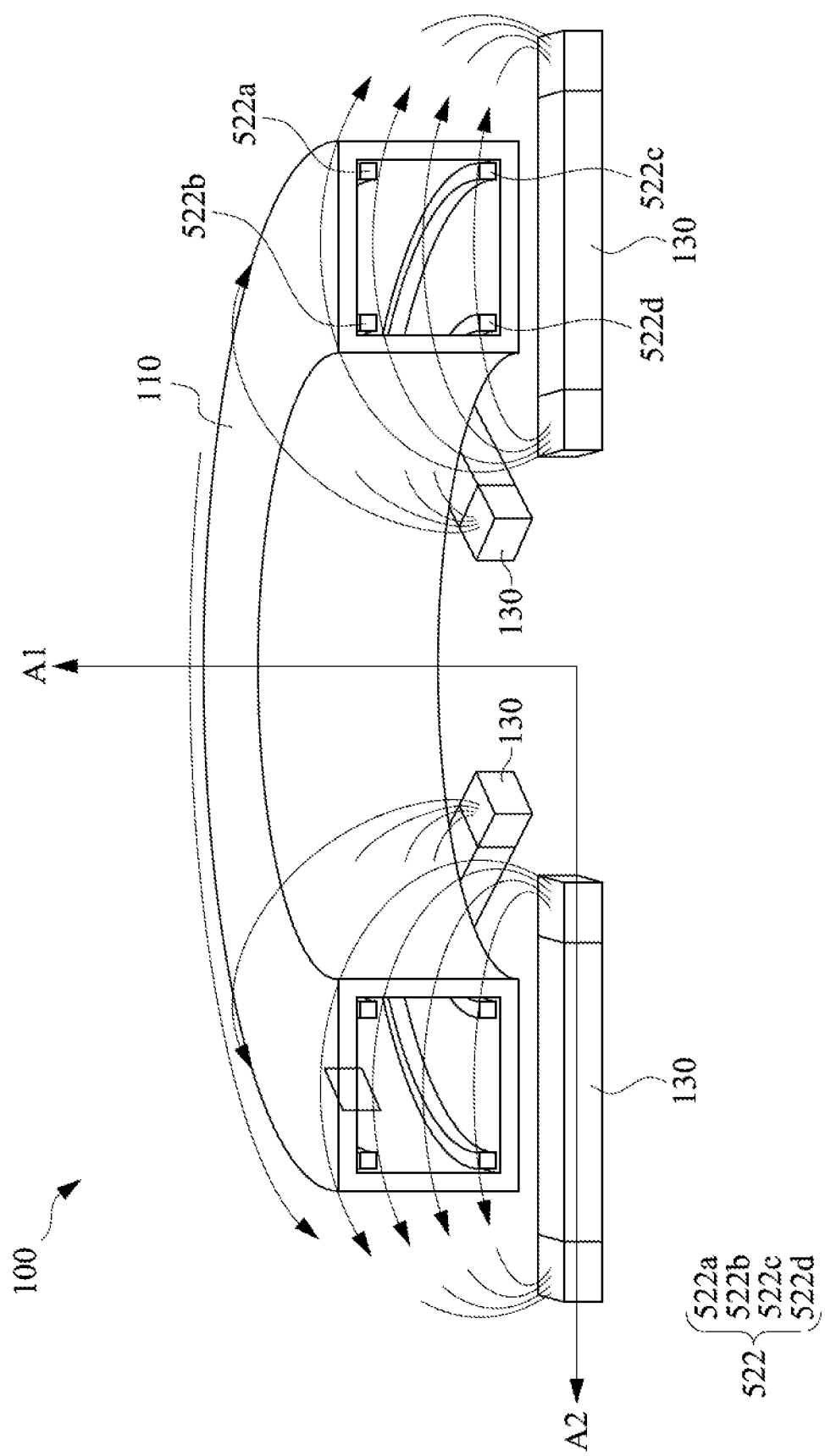
FIG. 6B schematically illustrates a power generation device with magnetic components, according to another embodiment of the present disclosure.

FIG. 6B schematically illustrates a power generation device 100 with magnetic components 130, according to another embodiment of the present disclosure. Reference is made to FIG. 6B, in some other embodiments, the power generation device 100 further includes multiple magnetic components 130 located on a same side of the housing 110 to rotate the housing 110 through a magnetic field produced by the magnetic components 130. Specifically, four magnetic components 130 are located at the bottom of the housing 110 in FIG. 6B. The magnetic components 130 are positioned along the radial direction A2 of the housing 110 according to different angles. In the embodiment shown in FIG. 6B, one side of each magnetic component 130 protrudes from the radius of rotation of the housing 110. In some embodiments, the magnetic components 130 are magnets, the N poles of the magnetic components 130 are pointed inward, and the S poles of the magnetic components 130 are pointed outward.

Reference is made to FIG. 6B, the magnetic field produced by the magnetic components 130 is shown as the arrows that linked the N poles and the S poles of the magnetic components 130, which is from inside out. The direction of the magnetic field is according to the position of the magnetic components 130 and may be different in other embodiments. In the example shown in FIG. 6B, the direction of the magnetic field is from the inside out, the housing 110 may rotate in the counter-clockwise direction. There are four electrodes 522 shown in FIG. 6B. When housing 110 is rotating, the positive ions and the negative ions of the conductive fillers inside the chambers may separate and produce voltage drops ΔV in a direction that is parallel to the rotation axis A1. For example, as shown in FIG. 6B, the voltage drops ΔV may produce between the first electrode 522a and the third electrode 522c and between the second electrode 522b and the fourth electrode 522d. When the N poles are pointed inward, and the S poles are pointed outward, the rotation of the housing 110 may lead the positive ions to move near to the magnetic components 130, and the negative ions to move away from the magnetic components 130. The rotation of the housing 110 may also produce voltage drops ΔV between the inside and the outside of the housing 110, as described above. In other words, in the embodiment shown in FIG. 6B, the voltage drops ΔV may produce between the first electrode 522a and the second electrode 522b and between the third electrode 522c and the fourth electrode 522d. Therefore, each of the four electrodes 522 may have different voltage values. By connect these electrodes 522 in series appropriately may added-up the voltage drops ΔV between them.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power generation device, comprising:
a housing having a rotation axis;
a plurality of chambers surrounding the rotation axis and disposed inside the housing; and
a plurality of conductive fillers respectively filled in the plurality of chambers, wherein a plurality of sidewalls of the chambers extend along a direction that is perpendicular to the rotation axis and divide an interior of the housing into a plurality of layers,
wherein the chambers comprise a plurality of electrodes disposed on the chambers and in contact with the conductive fillers,
wherein the electrodes at least comprise a first electrode that is adjacent to the rotation axis and a second electrode that is away from the rotation axis, one of the chambers electrically connects to an adjacent one of the chambers through the first electrode, and the one of the chambers electrically connects to another adjacent one of the chambers through the second electrode.

2. The power generation device of claim 1, wherein the conductive fillers respectively in adjacent two of the chambers has different compositions.

3. The power generation device of claim 1, wherein the conductive fillers comprises plasma or ionic solutions.

4. The power generation device of claim 3, wherein ions of the ionic solutions comprise at least one of K+, Na+, Li+, Cl−, Br−, F−, I−, carbonate ion, acetate ion, formate ion, and acetate ion.

5. The power generation device of claim 3, wherein pH values of the ionic solutions are between 5 and 9.

6. The power generation device of claim 1, wherein the conductive fillers comprise at least one of water, methanol, ethanol, ethylene glycol, and water-soluble amides.

7. The power generation device of claim 1, further comprising a plurality of magnetic components disposed on two opposite sides of the housing respectively to rotate the housing through a magnetic field produced by the magnetic components.

8. The power generation device of claim 1, further comprising a plurality of magnetic components disposed on a same side of the housing to rotate the housing through a magnetic field produced by the magnetic components.

9. The power generation device of claim 1, wherein the housing and the chambers are heat conductors.

10. A power generation device, comprising:
   a housing having a rotation axis;
   a plurality of chambers surrounding the rotation axis and disposed inside the housing; and
   a plurality of conductive fillers respectively filled in the plurality of chambers, a plurality of sidewalls of the chambers extend along a direction that is parallel to the rotation axis and separate the housing into a plurality of rooms,
   wherein the chambers comprise a plurality of electrodes disposed on the chambers and in contact with the conductive fillers,
   wherein in a cross section perpendicular to the rotation axis, the rooms at least comprise a plurality of first rooms that are adjacent to the rotation axis and are isolated from each other and a plurality of second rooms that are away from the rotation axis and are isolated from each other.

11. The power generation device of claim 10, wherein one of the electrodes radially and electrically connects the conductive fillers in at least one of the first rooms and at least one of the second rooms relative to the rotation axis.

12. A power generation device, comprising:
   a housing having a rotation axis;
   a plurality of chambers surrounding the rotation axis and disposed inside the housing; and
   a plurality of conductive fillers respectively filled in the Plurality of chambers, wherein the chambers are a plurality of spheres and movable relatively to the housing,
   wherein the chambers comprise a plurality of electrodes disposed on the chambers and in contact with the conductive fillers,
   wherein the electrodes are disposed on a plurality of surfaces of the spheres, such that the conductive fillers respectively in two of the spheres are electrically connected through two of the electrodes respectively on the two of the spheres.

13. A power generation device, comprising:
   a housing having a rotation axis, wherein the housing further comprises a plurality of shells wrapped in sequence from the inside out, wherein the shells are rotatable relatively to each other;
   a plurality of chambers surrounding the rotation axis and disposed inside the housing; and
   a plurality of conductive fillers respectively filled in the Plurality of chambers,
   wherein the chambers comprise a plurality of electrodes disposed on the chambers and in contact with the conductive fillers.

14. The power generation device of claim 13, wherein the shells comprise a plurality of openings, and each shells includes at least two of the openings.

* * * * *